United States Patent [19]

Aldridge, Jr. et al.

[11] 3,922,203

[45] Nov. 25, 1975

[54] CULTURE MEDIA IN FILM FORMAT FOR CONDUCTING MICROBIAL ANALYSIS AND METHOD OF PRODUCING THE MEDIA AND LOADING IT INTO CASSETTES

[75] Inventors: Clifton Aldridge, Jr., Creve Coeur; Richard D. Vannest, St. Charles, both of Mo.

[73] Assignee: McDonnell Douglas Corporation, St. Louis, Mo.

[22] Filed: July 17, 1973

[21] Appl. No.: 380,070

[52] U.S. Cl. ............................................ 195/103.5
[51] Int. Cl.² ........................................... C12K 1/04
[58] Field of Search ........ 195/103.5, 139, 140, 141; 23/153 R, 259; 264/153, DIG. 37

[56] References Cited
UNITED STATES PATENTS

| | | | |
|---|---|---|---|
| 2,982,699 | 5/1961 | Johnson et al. | 195/103.5 |
| 2,998,353 | 8/1961 | Ryan | 195/103.5 |
| 3,107,204 | 10/1963 | Brown et al. | 195/139 |
| 3,416,998 | 12/1968 | Streitfeld | 195/103.5 |

*Primary Examiner*—A. Louis Monacell
*Assistant Examiner*—R. B. Penland
*Attorney, Agent, or Firm*—Gravely, Lieder & Woodruff

[57] ABSTRACT

A cassette used to analyze a carrier liquid for the presence of a specific microorganism therein has a passageway extending through it and the passageway is provided with filter and viewing wells arranged such that each viewing well is preceded by a filter well. The carrier liquid is introduced into the passageway at one end thereof. Each filter well contains a filter material capable of effecting a one log reduction in the microorganisms within the liquid as the liquid passes through the filter. Each viewing cell contains plugs having a culture medium therein which is selective to a specific microorganism in the sense that only that microorganism will grow in the culture medium and change the light-transmitting characteristics of the viewing wells. To load the filter wells a pad of filter material is placed over the ends of the filter wells and the filters are simultaneously stamped from the pad and driven into the filter wells. To load the viewing wells, a flexible sheet of culture medium is placed over the ends of the viewing wells and the plugs are stamped therefrom and simultaneously driven into the viewing wells. The flexible sheet of culture medium is formed by adding a film-forming agent to liquid culture medium, pouring the solution so formed onto a surface, and then evaporating volatile components of the solution. After the volatile components evaporate, the flexible film remains.. The film-forming agent may be gelatin and glycerin, or it may be polyvinyl alcohol.

9 Claims, 7 Drawing Figures

CULTURE MEDIA IN FILM FORMAT FOR CONDUCTING MICROBIAL ANALYSIS AND METHOD OF PRODUCING THE MEDIA AND LOADING IT INTO CASSETTES

BACKGROUND OF THE INVENTION

This invention relates in general to analyzing specimens for the presence of microorganisms therein, and more particularly to selective culture media in film format, a method of producing the media in such form, and a method of loading the media into cassettes.

U.S. patent application Ser. No. 255,533, filed May 22, 1971, (the disclosure of which is herein incorporated by reference) discloses a system for detecting, identifying, and enumerating microorganisms which are important from a medical standpoint. That system basically includes introducing the specimen to be analyzed into the distilled water, and then distributing the distilled water containing the specimen to several cassettes. Each cassette contains a somewhat serpentine passageway having filters and freeze dried selective culture media therein. Actually, the selective culture media is disposed in viewing wells located beyond the filters. The culture media is selective in the sense that it will promote the growth or specific chemical activities of only one type of microorganism, and that growth or chemical activity is such that it changes the light-transmitting characteristics of the wells. The distilled water flows through the passageway and the filters therein and dissolves the culture medium. At each filter 90% of the microorganisms are removed so that the concentration of microorganisms in the first viewing well is considerably greater than in the last.

If the water contains the selected microorganism, it will grow in the wells and change the light-transmitting characteristics thereof. The change in light-transmitting characteristics is detected by means of photocells, and is plotted against time to produce a plot unique to the microorganism.

The selective media used in the cartridges heretofore utilized has taken the form of a freeze dried powder which rehydrates upon coming in contact with the distilled water. It is placed in the viewing wells by a hand packing operation which is a time-consuming and inefficient procedure. Moreover, the filters must be installed from the two edges of the cartridge which is also a time-consuming procedure.

SUMMARY OF THE INVENTION

One of the principal objects of the present invention is to provide selective culture media which are easily loaded into cassettes. Another object is to provide the culture media in the form of flexible films from which plugs can be punched. A further object is to provide a process for producing the culture media. An additional object is to provide a process for easily and inexpensively loading the media into cassettes in which the light-transmitting characteristics of the media may be observed. These and other objects and advantages will become apparent hereinafter.

The present invention is embodied in a method of producing the sheet material from which the culture media plugs are stamped, and that method involves mixing a selective liquid culture medium with a film forming agent, pouring the solution so formed on a surface, and allowing the water to evaporate from the solution. Finally, the invention further resides in the film itself and the method of loading it into cassettes. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
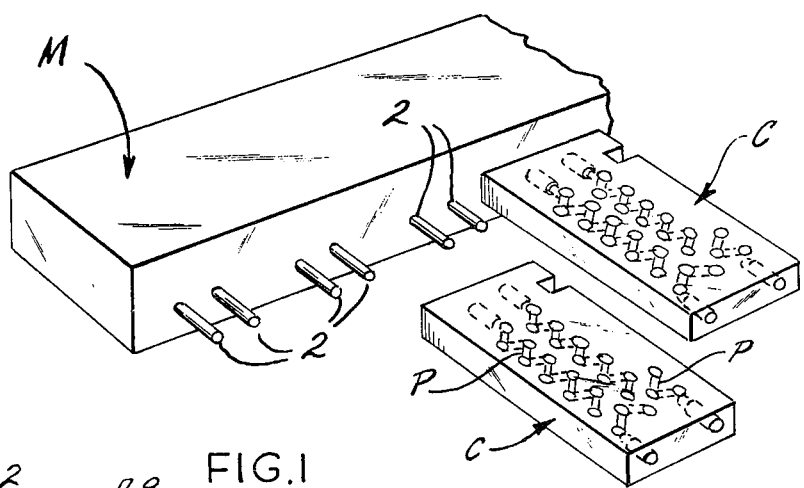
FIG. 1 is a perspective view showing cassettes which are prepared for use (loaded) by the present invention as they are filled with a liquid containing microorganisms.

Referring now to the drawings (FIG. 1), C designates a cassette which attaches to a manifold M into which distilled water or some other diluent containing microorganisms is subsequently introduced. The manifold M has filling needles 2 projecting from the sides thereof, and these needles are hollow throughout the length thereof. The hollow interiors of the needles 2 open into the hollow interior of the manifold M so that the distilled water will leave the manifold M through the needles.

Each cassette includes (FIGS. 2–4 and 7) a body 10 which is injection molded from a plastic substance such as polycarbonate or polyethylene. The plastic body 10 is quite small in size, being about 1¼ inches × 11/16 inch × ⅛ inch. Near one end of the body an indentation 12 opens outwardly through one of the side edges. The indentation 12 enables the cassette C to be gripped so that it may be inserted into and retrieved from an optical detecting device.

The body contains two entry bores 14 which extend longitudinally thereof and open out of one of the end walls. These entry bores 14 are large enough to accommodate the needles 2 on the manifold M and are spaced apart such that they will align with adjacent needles 2. The entry bores 14 are occupied by tightly fitted elastomeric septums or plugs 16. As the cassette C is installed on the manifold, adjacent needles 2 of the manifold puncture the plugs 16 so as to place the interior of the cassette C in communication with the interior of the manifold M.

Figure 5:
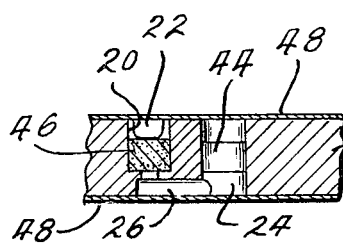
FIGS. 5 and 6 are fragmentary sectional views taken along lines 5—5 and 6—6, respectively, of FIG. 2 and showing the cross-sectional configuration of the serpentine passageway in the cassette.
Figure 6:
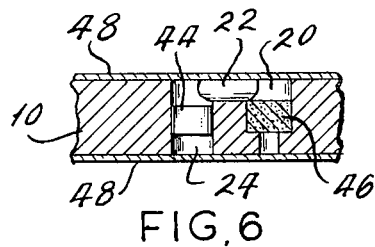
Figure 2:
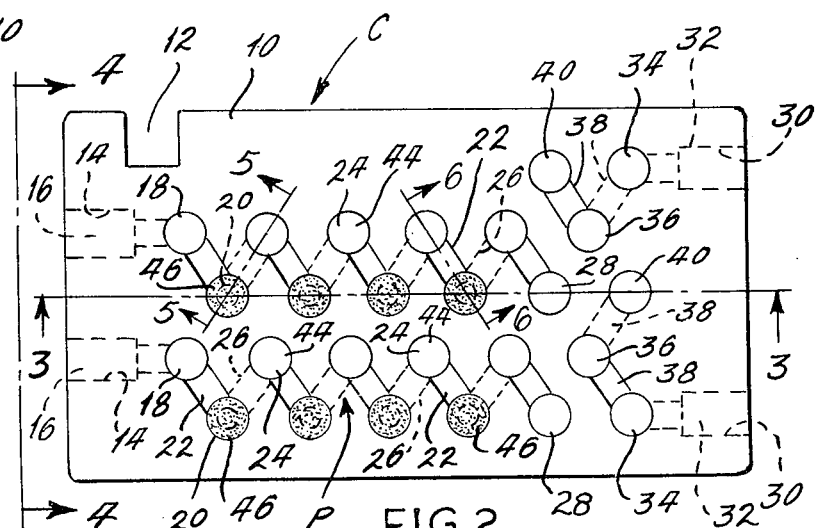
FIG. 2 is a plan view of a cassette.
Figure 4:
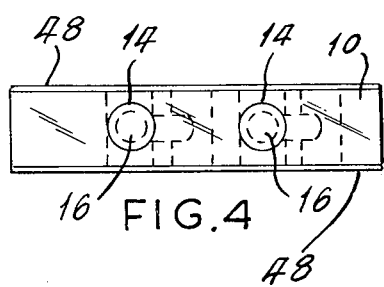
FIG. 4 is an end view of the cassette taken along line 4—4 of FIG. 2.
Figure 3:
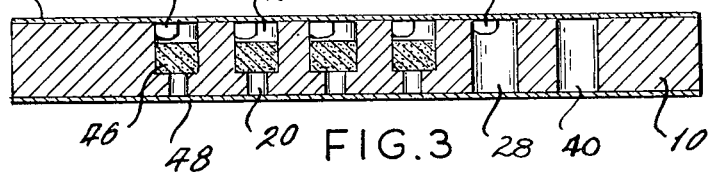
FIG. 3 is a sectional view taken along line 3—3 of FIG. 2.
Figure 7:
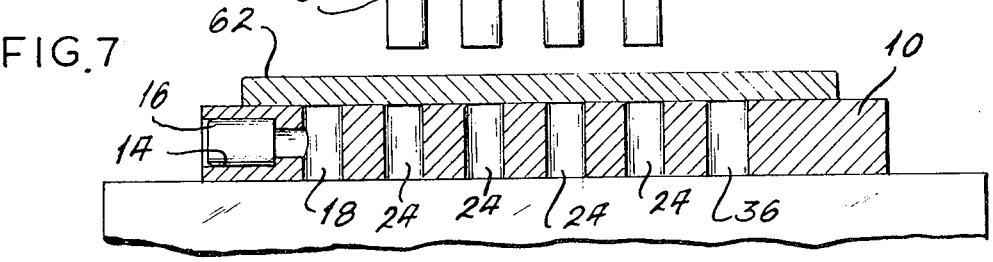
FIG. 7 is a schematic sectional view showing a punch poised over a flexible film containing culture medium, which film overlies a cassette so that upon descent of the punch, plugs of the culture medium will be blanked from the film and driven into the viewing wells of the cassette.

Each entry bore 14 opens into a crossbore 18 (FIG. 2) which extends through the body 10 from one side face to the other with its axis perpendicular to the entry bore 14. The crossbore 18 is in turn connected to a filter well 20 by means of a connecting channel 22 which extends diagonally through the body and opens out of one side of it. The filter well 20 in turn is connected to a viewing well 24 by means of another connecting channel 26 (FIG. 5) which, like the channel 22, extends diagonally to the body 10, but opens out of the other side of it. More filter wells 20 and viewing wells 24 are provided with the filter wells 20 being in one row and the viewing wells 24 being in another row. The row of viewing wells 24 aligns with the crossbore 18 (FIG. 2) and the entry bore 14, while the row of filter wells 20 is located to the side. Moreover, the filter wells 20 are staggered with respect to the viewing wells 24. Each filter well 20 is connected to the next downstream viewing well 24 through a connecting channel 26, while each viewing well 24 is connected to the next filter well 20 through a connecting channel 22 (FIG. 6). The last viewing well 24 is connected to an overflow well 28 (FIGS. 2 and 3) through a connecting channel 22, and that well aligns with the row of filter wells 20. All of the connecting channels 22 are parallel, and likewise so are all of the connecting channels 26, but the channels 22 and 26 extend in different directions. Each filter well 20 is actually a bore and a counterbore (FIGS. 3, 5 and 6), and is oriented such that the associated connecting channel 22 opens into the counterbore, while the associated connecting channel 26 opens into the bore. From the foregoing, it is apparent that the entry bores 14, the initial crossbores 18, the filter wells 20, the viewing wells 24 and the overflow wells 28 are all connected together by the connecting channels 22 and 26 to form two passageways P of somewhat serpentine configuration, and each passageway P has an entry bore 14 at the inlet end thereof and an overflow well 28 at the terminal end thereof (FIG. 2).

At the opposite end of the cassette C, that is the end opposite from which the entry bores 14 open, the plastic body 10 is provided with two more entry bores 30 (FIG. 2) having septums 32 therein. Each bore 30 opens into an initial crossbore 34 which is connected with a control well 36 through a channel 38, and the control well 36 is connected with an overflow well 40 through another channel 38. The two control wells 36 align with the two rows of viewing wells 24 of the serpentine passageways P. Nevertheless, the control wells 36 are completely isolated from the serpentine passageways P.

Each viewing well 24 contains a plug 44 of a culture medium which is selective for a specific microorganism such that light-transmitting characteristics will change when the specific microorganism is introduced into and incubated within the medium, and these plugs are generally centered between the connecting channels 22 and 26 so as not to block the ends of either one of those channels. Generally speaking, the selective culture medium is conducive to the growth or incubation of only one type or group of microorganism, and when the specific microorganism grows, the light-transmitting characteristics of the culture medium change. The selective culture medium for the plugs 44 of a single passageway P is the same, and the culture medium for the two passageways P may or may not be the same. The plugs 44 are derived from a film or sheet of flexible culture medium and are installed in the viewing wells with the aid of a punch press.

In particular, the plastic body 10 is placed on the bed of a punch press having punches 60 (FIG. 7) which are sized to fit into the viewing wells 24 and are spaced apart a distance equal to the spacing between the wells 24. The bed of the press is provided with locating pins or other devices for positioning the plastic body 10 with its wells 24 precisely aligned with the punches 60. Thereupon, the film 62 of flexible culture medium is placed over the plastic body 10, and the punches 60 are driven into the film 62. The punches 60 blank the plugs 44 from the film 62 of medium and drive those plugs into the viewing wells 24 where they lodge.

Each filter well 20 contains a filter 46 having a pore size in the 2 micron range. The filters 46 may be formed from asbestos or glass fibers, and are installed in the filter wells 20 similar to the manner in which the plugs 44 are installed.

Once the plastic body 10 is loaded with the filters 46 and culture medium plugs 44, strips 48 (FIG. 3) of sterile transparent tape are placed over the sides of the plastic body 10, and these tape strips 48 close the ends of the wells 20, 24, 28, 36 and 40 as well as the ends of the crossbores 18 and 34, and furthermore close the formerly open sides of connecting channels 22 and 26. Thus, the channels 22 and 26 form closed connections between the filter wells 20 and the viewing wells 24.

As previously mentioned, the distilled water containing the microbial inoculum is introduced into the cassette C at room temperature through the septums 16 in the entry bores 14 thereof. This water flows first into initial crossbore 18 and then into the first connecting channel 22 which empties into the enlarged end or counterbore of the first filter well 20. Thereupon, the water flows through the filter 46 in that filter well 20 where about a one log or 90% reduction in microorganisms occurs. Next the water flows into the connecting channel 26 on the opposite side of the plastic body 10, and that channel directs the water into the first viewing well 24 where it flows through the culture medium plug 44 therein. The water continues to pass through the remaining filters 46 and culture medium plugs 44 in succession. The displaced air collects in the overflow well 28 at the end of the serpentine passageway P. At each filter 46 about a one log reduction in microorganisms occurs so that the concentration of microorganisms in the last viewing well 24 is substantially less than the concentration in the first viewing well 24. It is believed that the reduction in microorganisms at the filters 46 occurs by absorption as well as filtration. In any event, the same filter medium, that is the asbestos or fiberglass fibers with pore size in the 2 micron range, achieves this one log reduction irrespective of the type of microorganism so that the same filter medium may be used with all selective culture media. The water containing the microbial inoculum takes about 5 to 15 seconds to flow to the ends of the passageway P.

The film from which the plugs 44 are blanked should have a thickness between 0.001 and 0.015 inches and at that thickness it should be at least translucent. The film is flexible and its strength varies from 650 psi to 18,000 psi as a function of the ingredients. When the film is introduced into water, the culture medium within it dissolves in the water.

The compositions of several selective culture media are disclosed in U.S. patent application Ser. No. 255,533, filed May 22, 1972. These culture media are freeze dried powders and may be used in the present invention by rehydrating them with distilled water and then converting the liquid media so derived into flexible sheets. Likewise, the liquid media which would normally be freeze dried may simply be converted into flexible sheets, thus eliminating the freeze drying and subsequent rehydration. In any event, the culture media should be in a liquid state for conversion into a flexible film or sheet. The conversion is effected by the addition of a film-forming agent to the liquid culture medium and allowing the liquid, which is mostly water, to evaporate. The film forming agent should neither be toxic to nor a nutrient for the microorganisms. It should further be soluble in water and also should be miscible in the liquid culture medium.

Where the liquid culture medium is compatible with gelatin, it is desirable to use biological grade gelatin as the film-forming agent. This gelatin melts at between 35°C. and 40°C. To form the flexible sheet, between 2.8 and 3.2 g of the biological grade gelatin are added to between 95 and 105 ml. of liquid culture medium, and then between 0.7 and 0.9 ml. of chemically pure glycerin is added. Preferably, 3.0 g. of biological grade gelatin is added to 100 ml. of liquid culture medium, and then 0.8 ml. of chemically pure glycerin is added. Both the gelatin and glycerin dissolve in the liquid culture media, and the solution so formed is poured onto a flat plastic or glass surface, the area of which is between 45 and 55 square inches and preferably is 49 square inches. The solution is allowed to dry on the surface for between 1 and 3 days at between 15°C. and 35°C. Preferably, it should dry for 2 days at room temperature. At the end of that time a flexible film or sheets having a thickness of between 0.001 to 0.015 inches remains. This film contains some water which prevents the film from becoming brittle, and the amount of water is dependent on the humidity of the surrounding atmosphere. In other words, the film, insofar as its moisture content is concerned, reaches an equalibrium condition with the atmosphere. The film is stripped or peeled away from the plastic or glass surface and is stored between sterile strips of paper until used, that is, until the culture media plugs 44 are blanked from it.

For selective media incompatible with gelatin, polyvinyl alcohol (99% hydrolyzed) may be used as the film-forming agent. In particular, between 1.8 and 2.2 g. of the polyvinyl alcohol are added to between 95 and 105 ml. of liquid culture medium. Preferably, 2 g. of polyvinyl alcohol (99% hydrolyzed) are added to 100 ml. of liquid culture medium. The solution so formed is poured onto a surface and the volatile components are allowed to evaporate as previously described. The end result is a film having a thickness of between 0.001 and 0.015 inches, and this film is peeled away from the surface. This film also contains water with the water being in equilibrium with the water content of the surrounding atmosphere. One culture medium suitable for use in the present invention is used to detect coliform organisms (Escherichia coli) which are found primarily in fecal specimens and cause enteric infection. The selective medium for this microorganism is prepared by dissolving 10 g. of lactose and 10 g. of gelysate in 1.0 liter of distilled water. Next, HCl or NaOH are added to bring the pH to 7.4. Thereafter, 10 g. of sodium desoxycholate are added. The mixture may be heated to dissolve the ingredients, but should not be brought to a boil. Finally, the solution is sterilized by filtering and 13.3 mg. of brilliant green are added.

From 20 to 42.9% lactose, from 20 to 42.9% gelysate, from 20 to 42.9% sodium desoxycholate, and from 0.04 to 0.06% brilliant green can be used and the pH may vary from 6.6 to 8.5. The percents are by weight based on the weight of dry ingredients.

OPERATION

When it is desired to detect, identify, and enumerate, microorganisms in a specimen, the specimen is introduced into the distilled water maintained at room temperature in the manifold M, and cassettes C containing culture media selective to different microorganisms are attached to the manifold by inserting the needles 2 of the manifold through the septums 16 in the entry bores 14 of the cassettes C. Since each cassette C has two passageways P, each cassette C may contain culture media selective to two different microorganisms. The distilled water from the manifold M will flow through the needles 2 and into the crossbore 18 at the entry end of each serpentine passageway P. The channel 22 leading from each crossbore 18 discharges the water into the first filter well 20, and a one log or 90% reduction in microorganisms occurs as the water flows through the first filter 46. After leaving the first filter 46, the water flows through the small diameter end of the filter well 20 and into the connecting channel 26 leading therefrom. That channel directs the water to the first viewing well 24. The water passes through the flexible medium plug 44 and in so doing the water and particularly the microorganisms in it come in contact with the culture medium. Where gelatin and glycerin are employed to produce the flexible medium plug 44, the water tends to dissolve the plug 44 and this in turn releases the culture medium into the water. On the other hand, where polyvinyl alcohol is used as the film-forming agent, the water tends to leach the culture medium from the plug 44. In any event, the culture medium dissolves in the water within the viewing wells 24. This subjects the microorganisms in the viewing well 24 to the culture medium and thereby provides an environment conducive to the growth and multiplication of specific microorganisms.

After flowing through the first viewing well 24 and medium plug 44 therein, the water enters the channel 22 leading from that viewing well and flows to the next filter well 20 where it passes through filter 46 thereof. At this filter 46 another 90% reduction in microorganisms occurs. The water flows successively through the remaining filter wells 20 and viewing wells 24 and the displaced air collects in the overflow well 28. At each filter 46 about a 90% reduction in microorganisms occurs. As a result the water in the crossbore 18 will contain about 10 times as many microorganisms as the water in the first viewing well 24, and the water in the first viewing well 24 will contain about ten times as many microorganisms as the water in the second viewing well 24, etc. The water containing the microbial inoculum takes about 5 to 15 seconds to reach the end of the passageway P. The gelatin or polyvinyl alcohol of the plugs 44 does not clog or otherwise adversely affect the subsequent filters 46 as the microorganisms are trapped therein.

More water is introduced into the control well 36 at the opposite end of the cassette C by way of the entry bore 30 which opens out of that end. The control well 34 contains only the culture medium and sterile water. The culture medium in the well 34 is the same as the culture medium in the viewing wells 24 aligned with the well 36.

After the serpentine passageways P and the control wells 36 of the cassette are filled with distilled water, the cassette C is heated to 35°C. and held for incubation at that temperature for between 3 and 10 hours, the length of time being dependent on the microorganism. If the water contains a microorganism which is specific to the culture medium in the cassette C, the specific microorganism will be incubated in the viewing wells 24 and accordingly will grow and multiply. This growth and multiplication is manifested by a change in the light-transmitting characteristics of the viewing wells 24, and that change is detected by periodically projecting a beam of light, preferably of 665 nanometers wave length, through the wells 24 and measuring the intensity of the light leaving the wells 24 by means of a photoelectric cell. The measurements of intensity as well as the time at which they are taken are recorded, and thereafter plotted with the time being along one axis and the intensity along the other. In some but not all cases, the resulting plot is unique to the specific microorganism and hence can be used to identify it. The number of wells 24 reacting provides an indication as to the concentration of microorganisms present in or upon the original sampling site.

A light beam is also projected through each control well 36 at periodic intervals. If the light-transmitting characteristics of the control well 36 remain substantially unchanged, those characteristics can be compared to the characteristics of the wells which do contain microorganisms to differentiate between growth and no growth for the control wells 36 contain only sterile culture media.

The procedure and equipment for conducting the tests are described in more detail in U.S. patent application Ser. No. 255,533, filed May 22, 1972.

This invention is intended to cover all changes and modifications of the example of the invention herein chosen for purposes of the disclosure which do not constitute departures from the spirit and scope of the invention.

What is claimed is:

1. A method of loading a cassette used to analyze a carrier liquid for the presence of specific microorganisms therein, said cassette having a rigid body containing a passageway which includes a plurality of viewing wells, the interiors of which are visible from outside the cassette, each viewing well initially having at least one of its ends opening outwardly through a face of the rigid body, said method comprising: placing a flexible sheet of material containing a culture medium which is selective to the said specific microorganism over the open ends of the viewing wells; forming plugs from the sheet and driving the plugs into the viewing wells substantially contemporaneously; and closing the initially open ends of the viewing wells.

2. The method of claim 1 wherein the sheet material contains gelatin and glycerol in addition to the selective culture medium.

3. The method of claim 1 wherein the sheet-like material contains polyvinyl alcohol in addition to the selective culture medium.

4. The method of claim 1 wherein the cassette contains filter wells and including the steps of placing a sheet of filter material over open ends of the filter wells forming filters sized to fit said filter wells from filter sheet, and positioning the filters as formed into the filter wells.

5. The method of claim 4 wherein the filters are punched from the filter sheets and driven into the filter wells contemporaneously.

6. A self-supporting flexible film for use in detecting the presence of a specific microorganism, said film comprising: water, a film forming agent, and a culture medium in and supported by the film forming agent, the film forming agent imparting body and flexibility to the film and being soluble in water, miscible in the culture medium, and nontoxic to the specific microorganism, the culture medium being selective in that the specific microorganism will be sustained by the culture medium and when so sustained only that microorganism will alter the light-transmitting characteristics of a solution of the culture medium and water, the culture medium being releasable from the film forming agent when the film is subjected to water.

7. A flexible material according to claim 6 wherein the film-forming agent includes gelatin and glycerin.

8. A flexible material according to claim 6 wherein the film-forming agent includes polyvinyl alcohol.

9. The sheet of claim 6 being from about 0.001 to about 0.015 inches in thickness.

* * * * *